United States Patent [19]

Booher

[11] 3,912,755

[45] Oct. 14, 1975

[54] PREPARATION OF PHARMACEUTICAL INTERMEDIATES

[75] Inventor: Richard N. Booher, Indianapolis, Ind.

[73] Assignee: Eli Lilly and Company, Indianapolis, Ind.

[22] Filed: Jan. 30, 1974

[21] Appl. No.: 438,136

[52] U.S. Cl. ................. 260/326.5 J; 260/326.5 R; 260/570.5 C; 260/570.6
[51] Int. Cl.$^2$ ....................................... C07D 207/04
[58] Field of Search ................. 260/326.5 J, 570 SC

[56] References Cited
UNITED STATES PATENTS 3,151,124  9/1964  Huebner .......................... 260/326.5
3,171,858  3/1965  L'Italien .......................... 260/570.5

*Primary Examiner*—Raymond V. Rush
*Attorney, Agent, or Firm*—Walter E. Buting; Charles W. Ashbrook; Everet F. Smith

[57] ABSTRACT

α-1-1,2-diphenyl(-2-hydroxy-3-methyl-4-substituted-aminobutanes and β-dl-1,2-diphenyl-2-hydroxy-3-methyl-4-substituted-aminobutanes are converted by treatment with base to dl-1-phenyl-2-methyl-3-substituted-amino-1-propanones, which are intermediates in the preparation of analgesic substances.

4 Claims, No Drawings

PREPARATION OF PHARMACEUTICAL INTERMEDIATES

BACKGROUND OF THE INVENTION

The present invention relates to a process for converting alcohols, which have heretofore found little or no utility, into ketones which are valuable intermediates in the preparation of compounds which display potent analgesic activity.

Propoxyphene hydrochloride is a well known and widely used analgesic. The chemical name for propoxyphene is α-d-1,2-diphenyl-2-hydroxy-3-methyl-4-dimethylaminobutane propionate.

One of the processes for the preparation of propoxyphene comprises reacting a benzyl Grignard reagent with 1-phenyl-2-methyl-3-dimethylamino-1-propanone and acylating the resulting tertiary alcohol with propionic anhydride. The Grignard reaction yields 1,2-diphenyl-2-hydroxy-3-methyl-4-dimethylaminobutane as a mixture of four diastereoisomers, occuring as two racemic pairs or racemates.

In accordance with the usual practice, the less soluble diastereoisomeric pair is designated as the α-dl racemate and the more soluble as the β-dl racemate. In the foregoing process for the preparation of propoxyphene, the α-dl racemate is obtained in about 85% yield. The remainder of the reaction product comprises about 15% of the β-dl racemate which is discarded since this racemate lacks analgesic activity. The α-dl-racemate is further separated into its α-d and α-l components. The α-d component is acylated with propionic anhydride, affording propoxyphene. Some of the α-l isomer is acylated to provide the active ingredient of an anti-tussive preparation, but such use of the α-l isomer does not equal that of the α-d isomer (propoxyhene) in terms of weight of drug used, and substantial quantities of the α-l isomer are discarded yearly.

I have now discovered a new and useful process by which these α-l and β-dl isomers may readily be converted to an intermediate which is useful in the preparation of analgesic substances, including, of course, propoxyphene.

SUMMARY OF THE INVENTION

This invention provides a process for the conversion of the α-l and β-dl diastereoisomeric carbinols of the formula

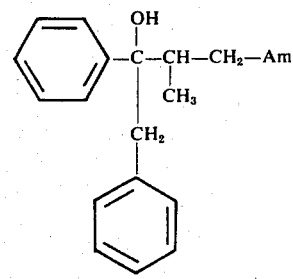

where Am represents a dimethylamino or pyrrolidino group, or an acid addition salt thereof, into a dl mixture of ketones of the formula

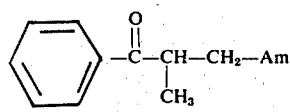

The process of the invention comprises treating the starting tertiary carbinol with a strong base in the presence of an inert organic solvent to afford the desired ketone.

DESCRIPTION OF THE PREFERRED EMBODIMENT

In accordance with the process of the present invention, α-l and β-dl carbinols of the formula

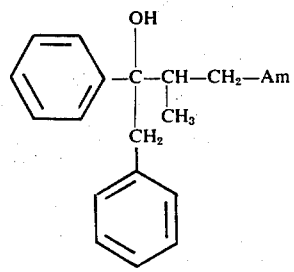

wherein Am represents a dimethylamino or pyrrolidino group, or an acid addition salt thereof, are contacted with a strong base in an inert organic solvent to afford a phenyl aminoalkyl ketone.

Acid addition salts of amines refers to the pharmaceutically acceptable nontoxic salts formed with mineral acids such as hydrochloric acid, hydrobromic acid, nitric acid, phosphoric acid, and the like. Other nontoxic salts include those prepared with organic acids, for example acetic acid, maleic acid, benzoic acid, 2-naphthalenesulfonic acid, and the like.

A strong base refers herein to a base selected from among the group of alkali metal and alkaline earth metal lower alkoxides, aryloxides, hydroxides or hydrides. Lower alkoxides include methoxide, ethoxide, n-propoxide, isopropoxide, n-butoxide and tert-butoxide. Suitable aryloxides include phenoxide and naphthoxide. Typical bases employed in the process of this invention include sodium hydroxide, potassium tert-butoxide, sodium hydride, magnesium hydroxide, calcium hydroxide, barium hydride, sodium methoxide, lithium ethoxide and sodium phenoxide.

The amount of base used to effect the conversion of carbinol to ketone is not critical. It should be noted, however, that when the starting amino carbinol is in the form of an acid addition salt, an amount of base will be required sufficient to convert the acid addition salt to the free amino carbinol, with enough base remaining in the reaction mixture to convert the carbinol to ketone. Preferably, one stoichiometric equivalent of base will be used for each mole of free amino carbinol used. For example, when one mole of free amino carbinol is used as the starting material, one equivalent of base, preferably potassium tert-butoxide, can be employed. More base may be used if desired, preferably up to about a 50 percent equivalent excess, however, even larger excesses of base can be used if desired and are not detrimental. Also, less than one equivalent of base can be used, however lower yields of ketone are normally observed.

The conversion of a tertiary carbinol into a ketone is thus accomplished by contacting the carbinol with a base in an inert organic solvent. Solvents normally used include those of the ether class, especially tetrahydrofuran, diethyl ether, dioxane, and 1,2-dimethoxyethane. Lower alkyl nitriles such as acetonitrile and propionitrile may also be used. Preferred solvents for the reaction are the lower alkyl sulfoxides, including dimethyl sulfoxide, diethyl sulfoxide, or dipropyl sulfoxide. Mixtures of solvents may be employed if desired, for example, a mixture of dimethyl sulfoxide and tetrahydrofuran.

The concentration of the carbinol in the solvent is not of a critical nature; however, the reaction proceeds best if the carbinol is completely dissolved in the solvent being used. The usual concentration employed in the reaction is about 500 mg. to about 2000 mg. of carbinol per about 10 to 15 cc. of solvent. When the solvent being used is dimethyl sulfoxide, the preferred concentration of the reaction solution is about 1000 mg. of carbinol per 10 cc. of solvent.

The duration and temperature of the reaction can be varied widely, depending upon the base being used and the solvent. The reaction is best carried out between a temperature of about 20° and about 100°C., preferably in the range of about 50° to 75°C. At this preferred temperature, the reaction is substantially complete within about ½ hour to about 4 hours. The yields of product are at a maximum when the reaction is carried out in an inert atmosphere in the absence of oxygen. An atmosphere of nitrogen or argon gas is usually employed.

The process is preferably carried out by dissolving a carbinol in a solvent, preferably dimethyl sulfoxide, and heating the solution to about 70°C. in an inert atmosphere, such as a nitrogen atmosphere. Next, a suitable base is added, preferably potassium tert-butoxide, and the reaction mixture is heated for about 30 minutes. The product can be isolated by cooling the reaction mixture to about 20° to 30°C. and adding water to the reaction solution, normally about 1 to 4 volumes of water. Alternatively, ice may be added directly to the warm reaction mixture, thereby cooling the reaction mixture while at the same time diluting the solution with water. The amount of ice used is preferably enough to cool the reaction mixture to about 20° to 30°C. The product is insoluble in the aqueous solvent mixture so formed and can be extracted therefrom with an immiscible organic solvent, such as diethyl ether, dichloromethane, chloroform or ethyl acetate. The organic extracts, which contain the product, may be evaporated to give the product ketone. Purification of the ketone may be accomplished by conventional methods, such as distillation, crystallization or chromatography. Alternatively, the product can be isolated as an acid addition salt. For example, the reaction mixture can be cooled and added to water and the product extracted therefrom with an immiscible organic solvent, as described hereinabove. A suitable acid can be added to the organic extract solution, thereby forming the acid addition salt of the amino ketone. The amino ketone acid addition salt normally precipitates out of the organic solution. The crystals so formed can be filtered and recrystallized if desired. Mineral acids, as well as organic acids, may be used to form acid addition salts of the amino ketones. Preferred mineral acids are hydrochloric, hydrobromic and sulfuric acids. Organic acids commonly used include methanesulfonic, benzoic, acetic, propionic, citric, maleic, and like acids.

The acid addition salts of the amino ketones can be readily converted to the free amino ketones by treatment with a suitable base. The alkali metal hydroxides such as sodium hydroxide or potassium hydroxide are normally used as the preferred base, however, bases such as ammonium hydroxide, pyridine or triethylamine are also suitable.

The product of the reaction described hereinabove is a dl-1-phenyl-2-methyl-3-substituted-amino-1-propanone. This product is useful as a starting material in the preparation of analgesic compounds. For example, in the preparation of propoxyphene, as described in U.S. Pat. No. 2,728,779, dl-1-phenyl-2-methyl-3-dimethylamino-1-propanone is treated with benzylmagnesium chloride to give about 85 percent of α-dl-1,2-diphenyl-2-hydroxy-3-methyl-4-dimethylaminobutane and about 15 percent of the β-dl-racemate.

The α-dl and β-dl racemates are separated by crystallization, with the α-dl racemate being, as previously stated, the less soluble. The α-dl mixture is further separated into its component isomers, and the α-d isomer is treated with propionic anhydride to afford propoxyphene.

By collecting the separated β-dl and α-l-1,2-diphenyl-2-hydroxy-3-methyl-4-dimethylaminobutane and subjecting them to the process of the present invention, use can be made of otherwise essentially worthless substances.

Ketones prepared by the process described hereinabove are the following:
dl-1-phenyl-2-methyl-3-dimethylamino-1-propanone;
dl-1-phenyl-2-methyl-3-pyrrolidino-1-propanone;
dl-1-phenyl-2-methyl-3-dimethylamino-1-propanone hydrochloride.

The invention is further illustrated by the following detailed examples.

EXAMPLE 1

To 100 cc. of dimethyl sulfoxide is added 10 g. (0.035 mole) of α-l-1,2-diphenyl-2-hydroxy-3-methyl-4-dimethylaminobutane. While the resulting solution is stirred at 70°C. under a nitrogen atmosphere, 5 g. (0.043 mole) of potassium tert-butoxide is added in one portion. The reaction mixture is stirred at 70°C. under nitrogen for one-half hour, after which the reaction mixture is added to 400 g. of ice. The product is extracted from the resulting aqueous dimethyl sulfoxide solution with ether, (3 × 200 cc.). The ethereal extracts are combined, washed with water, and dried. Evaporation of the solvent under reduced pressure affords an oil which upon distillation gives 4.5 g. (67.5%) of dl-1-phenyl-2-methyl-3-dimethylamino-1-propanone. b.p. 120°–25°C. at 0.8 mm/Hg.

EXAMPLE 2

A solution of 10 g. (0.035 mole) of β-dl-1,2-diphenyl-2-hydroxy-3-methyl-4-dimethylaminobutane in 100 cc. of dimethyl sulfoxide is stirred and heated to about 70°C. under a nitrogen atmosphere. Potassium tert-butoxide, 5 g. (0.043 mole), is added to the solution, and the reaction mixture is stirred at 70°C. for one-half hour. The reaction mixture is poured over 400 g. of ice, and the product is extracted therefrom with dichloromethane (3 × 200 cc.). The organic extracts are combined and washed with water. After drying the organic portion over sodium sulfate and filtering off the drying agent, the filtrate is evaporated to dryness under reduced pressure, affording an oil. Distillation of the oil yields dl-1-phenyl-2-methyl-3-dimethylamino-1-propanone having about the same boiling point as the product obtained in example 1.

EXAMPLE 3

A solution of 20 g. (0.07 mole) of α-l-1,2-diphenyl-2-hydroxy-3-methyl-4-dimethylaminobutane, dissolved in 100 cc. of dimethyl sulfoxide, is stirred at 70°C. under a nitrogen atmosphere. To the warm solution is added in one portion 3.8 g. (0.07 mole) of sodium methoxide. The reaction mixture is heated at 70°C. and stirred under nitrogen for 3 hours. After the reaction mixture is added to 500 g. of ice, the resulting aqueous dimethyl sulfoxide solution is extracted with diethyl ether, (3 × 200 cc.). The ethereal extracts are combined, and the amine product is extracted therefrom with 1N hydrochloric acid (3 × 100 cc.) as an amine hydrochloride salt. The acidic extracts are combined and layered with fresh diethyl ether. The pH of the mixture is adjusted to 9.5 with 1N ammonium hydroxide solution, thus forming the amino ketone as the free base, which is insoluble in the aqueous alkaline layer. The alkaline layer is extracted with ether (3 × 100 cc.), and the ethereal extracts are combined, washed with water, and dried. Evaporation of the solvent under reduced pressure gives an oil. Distillation of the residual oil affords dl-1-phenyl-2-methyl-3-dimethylamino-1-propanone, 5,5 g. (41%). b.p. 95°–100°C. at 0.4 mm./Hg.

I claim:

1. The process for the preparation of the dl racemate of the ketone having the formula

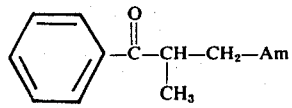

wherein Am is dimethylamino or pyrrolidino, or a pharmaceutically acceptable nontoxic acid addition salt thereof, which comprises reacting an α-l or a β-dl carbinol of the formula

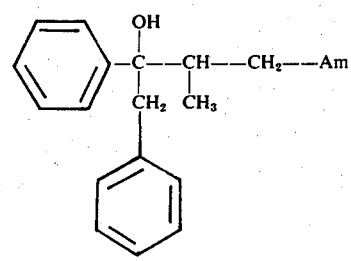

with a strong base selected from the group consisting of alkali metal and alkaline earth metal lower alkoxides, phenoxides, naphthoxides, hydroxides and hydrides, in the presence of an inert organic solvent.

2. The process of claim 1 wherein the base is potassium tert-butoxide and the solvent is dimethyl sulfoxide.

3. The process of claim 2 wherein Am is dimethylamino.

4. The process of claim 2 wherein the carbinol is employed as the hydrochloride salt.

* * * * *